Patented Feb. 6, 1945

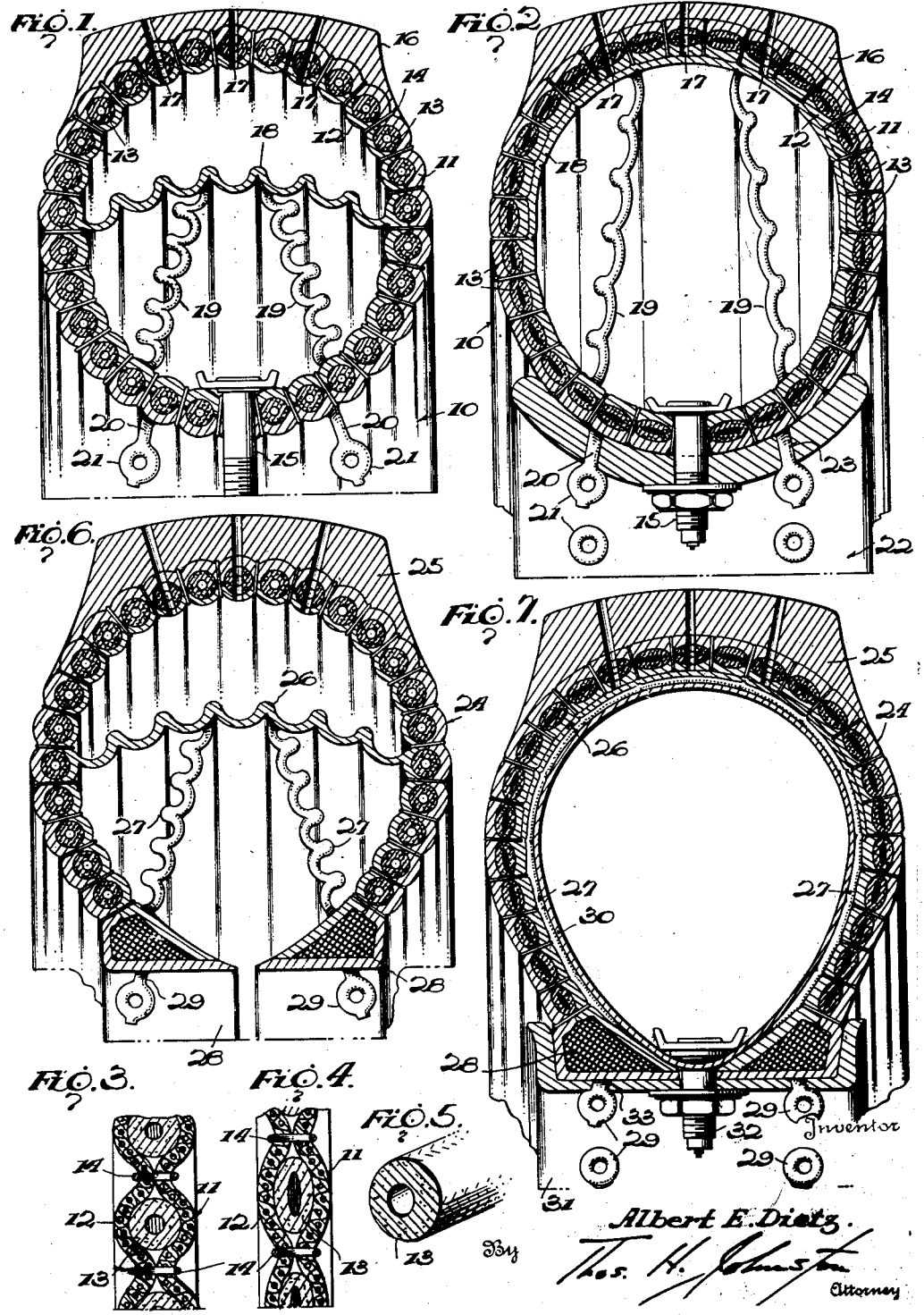

2,368,974

UNITED STATES PATENT OFFICE 2,368,974

PNEUMATIC TIRE

Albert E. Dietz, Washington, D. C.

Application February 2, 1942, Serial No. 429,308

4 Claims. (Cl. 152—165)

This invention relates to an improved pneumatic tire especially adapted for motor vehicles although, however, the tire is also suitable for use upon bicycles or other adaptations such as the landing wheels of aeroplanes and other ground wheels generally which employ pneumatic tires.

An object of the invention is to provide a tire which, in its make-up will minimize or even avoid the use of rubber while, at the same time, the cushioned riding qualities of the tire will be as good or better than a conventional composite tire employing rubber as an impermeable agent.

A further object of the invention is to provide a tire embodying a plurality of resilient cushioning elements in the wall thereof which will impart an elasticity and superior flexibility to said wall for cushioning road shock.

Still another object of the invention is to provide a tire having breather openings through the tread thereof for the passage of air tending to cool the tread while the tire is in motion, wherein said openings will be normally sealed by a diaphragm within the tire, and wherein said diaphragm will be flexed, as the tire rolls over a road surface, for drawing air inwardly through said openings and again expelling the air therethrough.

A further object of the invention, in the foregoing connection, is to provide a tire wherein the diaphragm will be secured at spaced circumferential points by stop ties limiting the distortion of the diaphragm at the crown thereof, whereby, as the tire is flexed in traveling over a road surface, the diaphragm will be prevented from following the crown of the tire at said points so that air will be drawn by the diaphragm through the openings in the tread and again expelled through said openings.

And the invention seeks, as a still further object, to provide a tire wherein, should the tire become punctured, the elastic elements in the wall of the tire will provide a cushion upon which the wheel may ride, and wherein means will be provided for securing the tire, when deflated, against dislocation from the wheel rim.

Other and incidental objects of the invention will appear during the course of the following description, and in the drawing:

Figure 1 is a transverse vertical section through my improved tire and showing it deflated.

Figure 2 is a view similar to Figure 1 showing the tire on a rim and inflated.

Figure 3 is an enlarged detail section showing the cushioning elements when the tire is deflated.

Figure 4 is an enlarged detail section showing the cushioning elements when the tire is inflated.

Figure 5 is a fragmentary perspective view showing a portion of one of the cushioning elements.

Figure 6 is a transverse vertical section of a modification of the invention and showing the tire deflated.

Figure 7 is a view similar to Figure 6 showing the tire on a rim and inflated.

Referring now more particularly to Figures 1 to 5 inclusive of the drawing, I employ a tubular casing 10, the wall of which embodies an outer cover 11 and an inner cover 12. Preferably, the covers 11 and 12 are each composed of a single ply of canvas or other suitable fabric but should necessity demand, multiple plies may be employed.

Enclosed between the covers 11 and 12 is an annular series of more or less closely spaced tubular cushioning elements 13 extending throughout the circumference of the tire. These cushioning elements are preferably formed of felt or other suitable fibrous material so that said elements will possess elasticity for resisting distortion and resiliency for resuming their normal round cross-sectional shape when pressure thereon is relieved. The degree of elasticity or resiliency of said elements may, of course, be varied as found most expedient. Securing the covers 11 and 12 together between the cushioning elements 13 are lines of stitching 14.

The wall of the casing 10, as thus described, is preferably impregnated with a suitable plastic substance which is substantially impermeable and capable of flexing to meet the demands on the tire in use. The parts 11, 12, 13 and 14 will thus be rendered substantially homogeneous and impervious to moisture while, also, the casing 10 will be conditioned to contain air under pressure. However, should a suitable plastic for the purpose not be available, rubber may be employed as a substitute in accordance with conventional practice. Entering the casing 10 is a suitable valve 15 through which the casing may be inflated.

Suitably imposed upon the casing 10 at the crown thereof is an appropriate tread 16, and formed through said tread and through the wall of the casing at spaced circumferential points are transverse rows of openings 17.

Fixed at its side margins to the wall of the casing 10, preferably at points on the horizontal diameter thereof, is a corrugated diaphragm 18. This diaphragm is preferably of a fabric suitably impregnated like the covers 11 and 12, and anchoring the crown of the diaphragm at spaced circumferential areas adjacent the rows of openings 17 are pairs of diverging fabric stop ties 19 extending between said crown and the inner periphery of the casing at its smaller circumference. The ties 19 are preferably impregnated like the diaphragm as well as looped to accommodate elongation thereof, and projecting from the cover 11 at points opposite the inner ends of the stop ties are pairs of diverging studs 20 which are more or less flexible and terminate in elastic heads 21 which may be ring-shaped, as shown.

In Figure 2 of the drawing, I have shown the tire on a concavo-convex rim 22 which is apertured to receive the valve 15. The rim may be of any suitable design except that for the purposes of the present invention, said rim is formed at suitably spaced circumferential points with pairs of openings 23 to receive the studs 20 therethrough so that the heads 21 lie at the inner periphery of the rim. As the tire is installed upon the rim, these heads are compressed and inserted through said openings when, after the studs 20 are seated and the heads emerge at the inner periphery of the rim, said heads will resume their normal shape for securing the tire upon the rim. Furthermore, as will be perceived, the headed studs will also serve to anchor the wall of the casing 10 at the points of outward radial pull thereon by the stop ties 19.

Assuming now that the tire is inflated to its rated normal pressure, as shown in Figure 2 of the drawing, it will be seen that the diaphragm 18 will be flexed to lie against the interior of the wall of the casing 10 at the crown thereof for normally sealing the rows of openings 17 through the tread 16, the stop ties 19 being extended their full length. However, as will be appreciated, the cross-sectional shape of the tire will, as the tire rolls over a road surface, be distorted both radially and transversely, with the result that the wall of the casing 10 will be caused to depress the diaphragm at the circumferentially spaced areas adjacent the rows of openings 17 and, due to the presence of the stop ties 19, will also be caused to slightly flex away from the diaphragm at said areas to subsequently return into contact therewith. Thus, as the wall of the casing 10 moves away from the diaphragm adjacent the areas of the outer ends of the stop ties, air will be drawn in through the rows of openings 17 by the diaphragm while, as the point of load on the tire shifts, the wall thereof will again move into contact with the diaphragm at said areas for expelling the air through said openings. The tread will thus be cooled.

It is further to be noted that when the tire is inflated, the cushioning elements 13 will be flattened more or less but will, however, retain an ovate cross-sectional shape to impart a pronounced elasticity and resiliency to the wall of the casing 10 for cushioning road shock. Furthermore, should the tire be punctured, the cushioning elements 13 will tend to resume their normal round cross-sectional shape, as shown in Figure 1, and will overlie the edges of the rim 22, when the tire is collapsed, to provide a cushion upon which the rim may ride, thus tending to prevent sudden injury to the tire. As will be perceived, dislocation of the tire from the rim, under such conditions, will be prevented by the headed studs 20.

In Figures 6 and 7 of the drawing, I have shown a modification of the invention embodying a beaded tire. The wall of the casing is indicated as a whole at 24, the tread at 25, the diaphragm at 26 and the stop ties at 27. Formed on the wall of the casing are beads 28 which carry headed studs 29 like the studs 20.

A suitable inner tube is indicated at 30 and a rim to receive the beaded tire at 31. The rim is apertured to accommodate the valve 32 of the inner tube and is also provided with openings 33 to receive the headed studs 29. Otherwise, the modified structure is identical with the form of the invention first disclosed and further description is accordingly believed unnecessary.

Having thus described my invention, what I claim is:

1. A pneumatic tire including a casing comprising a flexible external carcass wall embodying inner and outer covers flexibly secured together at transversely spaced points about said wall in superposed contact, and a plurality of spaced annular resilient tubular cushioning elements of elastic fiber confined between said covers at points between the points of contact thereof, said elements being capable of being flattened by air pressure distending the casing and adapted to expand toward original shape when said air pressure is relieved for contracting the distended casing toward normal shape.

2. A pneumatic tire including a casing comprising a flexible external carcass wall embodying inner and outer covers flexibly secured together at transversely spaced points about said wall in superposed contact, and a plurality of spaced annular tubular felt cushioning elements confined between said covers at points between the points of contact thereof, said elements being capable of being flattened by air pressure distending the casing and adapted to expand toward original shape when said air pressure is relieved for contracting the distended casing toward normal shape.

3. A pneumatic tire including a casing comprising external carcass wall embodying inner and outer covers flexibly secured together at transversely spaced points about said wall in superposed contact, a plurality of spaced annular resilient tubular cushioning elements of elastic fiber confined between said covers at points between the points of contact thereof, said wall providing side portions connected by a crown, and a flexible annular transverse diaphragm connecting the side portions of the casing and normally lying in spaced relation to the crown thereof, said diaphragm being corrugated to provide reserve width whereby the diaphragm may by air pressure be flattened against the inner surface of the crown without obstructing a volume of compressed air within the casing to distend the crown.

4. A pneumatic tire including a casing comprising a flexible external carcass wall embodying inner and outer covers flexibly secured together at transversely spaced points about said wall in superposed contact, a plurality of spaced annular tubular felt cushioning elements confined between said covers at points between the points of contact thereof, said wall providing side portions connected by a crown, a flexible annular transverse diaphragm connecting the side portions of the casing and normally lying in spaced relation to the crown thereof, said diaphragm being corrugated to provide reserve width whereby the diaphragm may by air pressure be flattened against the inner surface of the crown without obstructing a volume of compressed air within the casing to distend the crown, and stop ties extending between the median portion of the diaphragm and said side portions of the casing for limiting the flattening movement of the diaphragm at spaced annular points about the crown.

ALBERT E. DIETZ.